United States Patent [19]

Arques

[11] Patent Number: 4,827,145
[45] Date of Patent: May 2, 1989

[54] SOLID STATE LIGHT-SENSITIVE DEVICE AND METHOD FOR READING SUCH A DEVICE

[75] Inventor: Marc Arques, Grenoble, France

[73] Assignee: Thomson-CSF, Paris, France

[21] Appl. No.: 5,080

[22] Filed: Jan. 20, 1987

[30] Foreign Application Priority Data

Jan. 24, 1986 [FR] France ............................... 86 01054

[51] Int. Cl.⁴ .............................................. H01J 40/14
[52] U.S. Cl. .................................. 250/578; 358/213.16
[58] Field of Search ....................... 250/578, 208, 209; 357/24 R, 14, 23.1, 30, 32, 71, 213.15, 213.16

[56] References Cited

U.S. PATENT DOCUMENTS 3,521,244  7/1970  Weimer .............................. 250/209
4,380,755  4/1983  Endlicher et al. ................. 357/24 R
4,686,373  8/1987  Tew et al. ............................ 250/578
4,707,615  11/1987  Hosaka .............................. 250/578

Primary Examiner—David C. Nelms
Attorney, Agent, or Firm—Roland Plottel

[57] ABSTRACT

According to the invention, each light-sensitive element is made up by the series-connection of a capacitor, a photodiode and an electronic switch. The light signal to be read is applied to the device after the photodiodes have been reverse polarized by a voltage pulse with an amplitude $V_{P1}$. The device is read row by row, by the application of a voltage pulse with an amplitude $V_{P2}$ greater than $V_{P1}$ to each row read. The switches of the read row are closed while the switches of the other rows are open. Once the device is read, the photodiodes are zeroized.

23 Claims, 12 Drawing Sheets

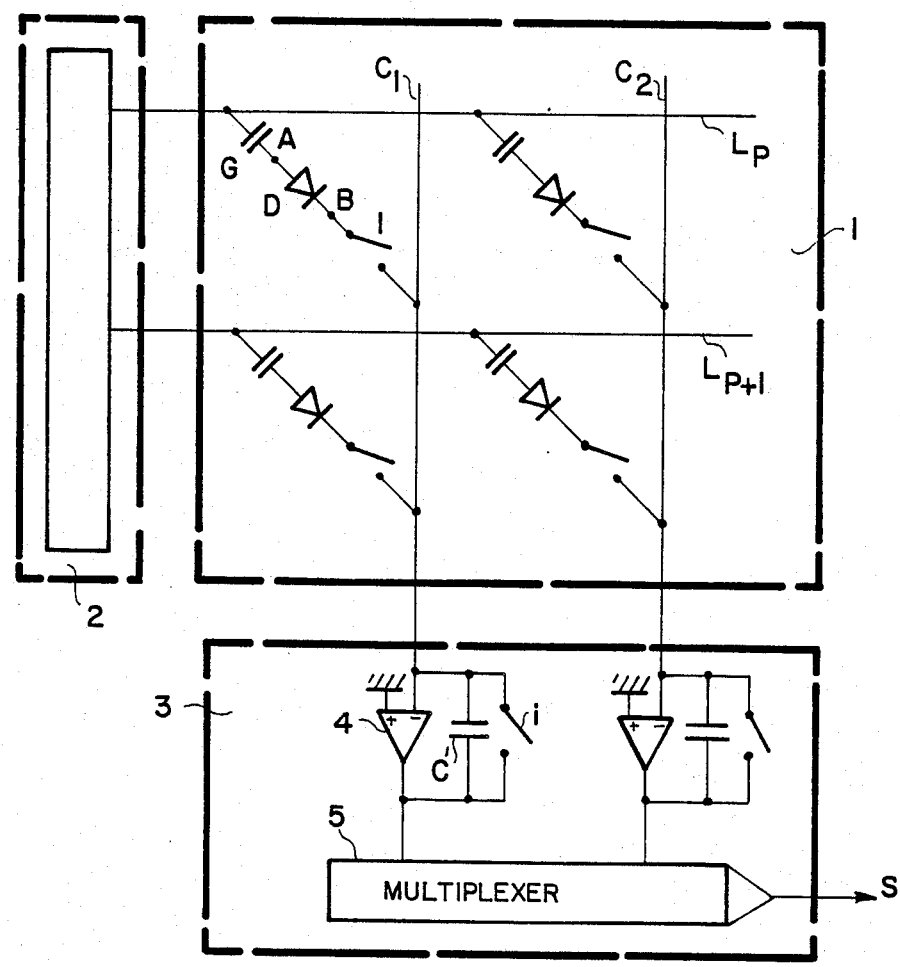
FIG_1

FIG_2
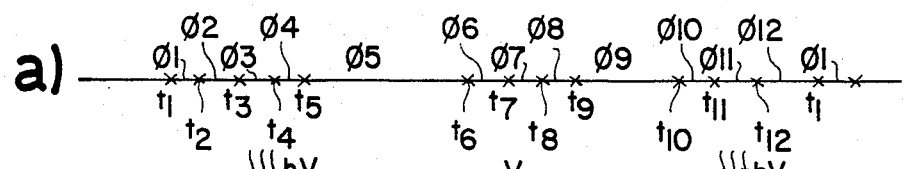
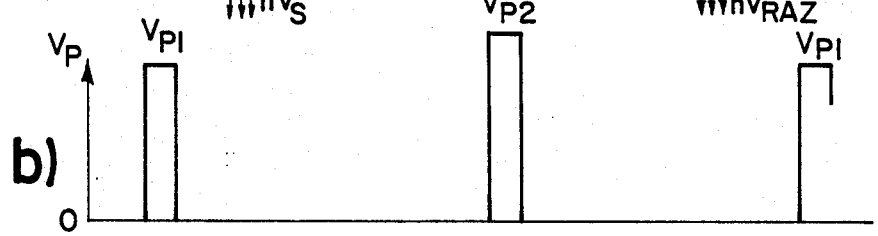
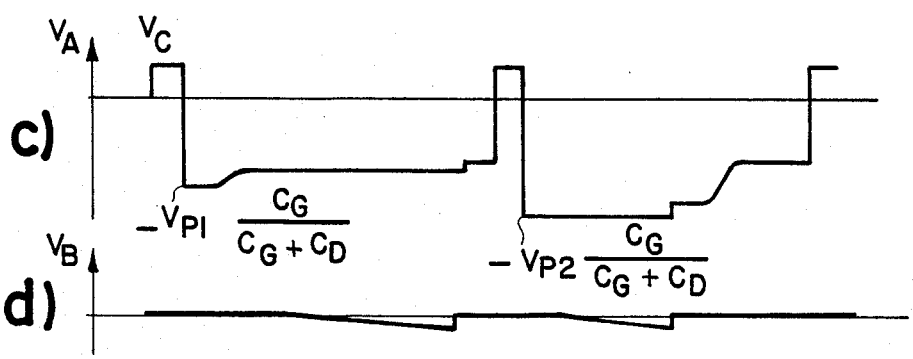
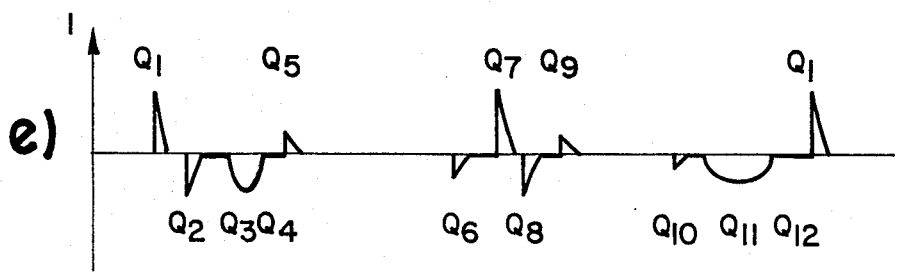
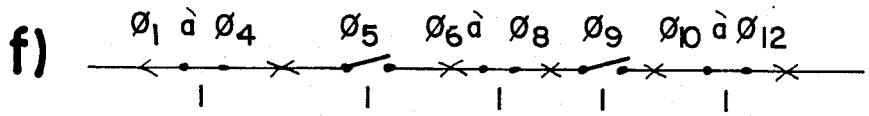

FIG_3
a) 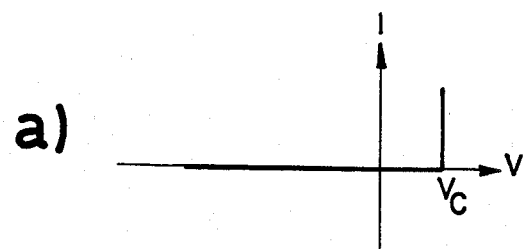
b) 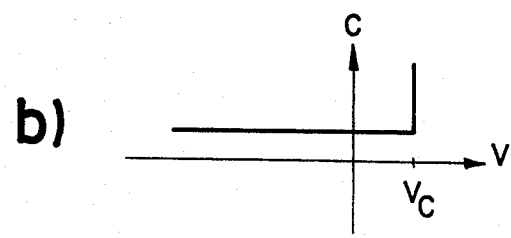
c) 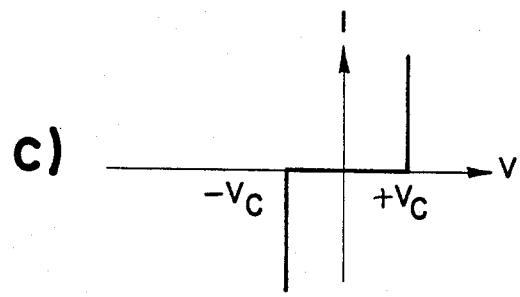

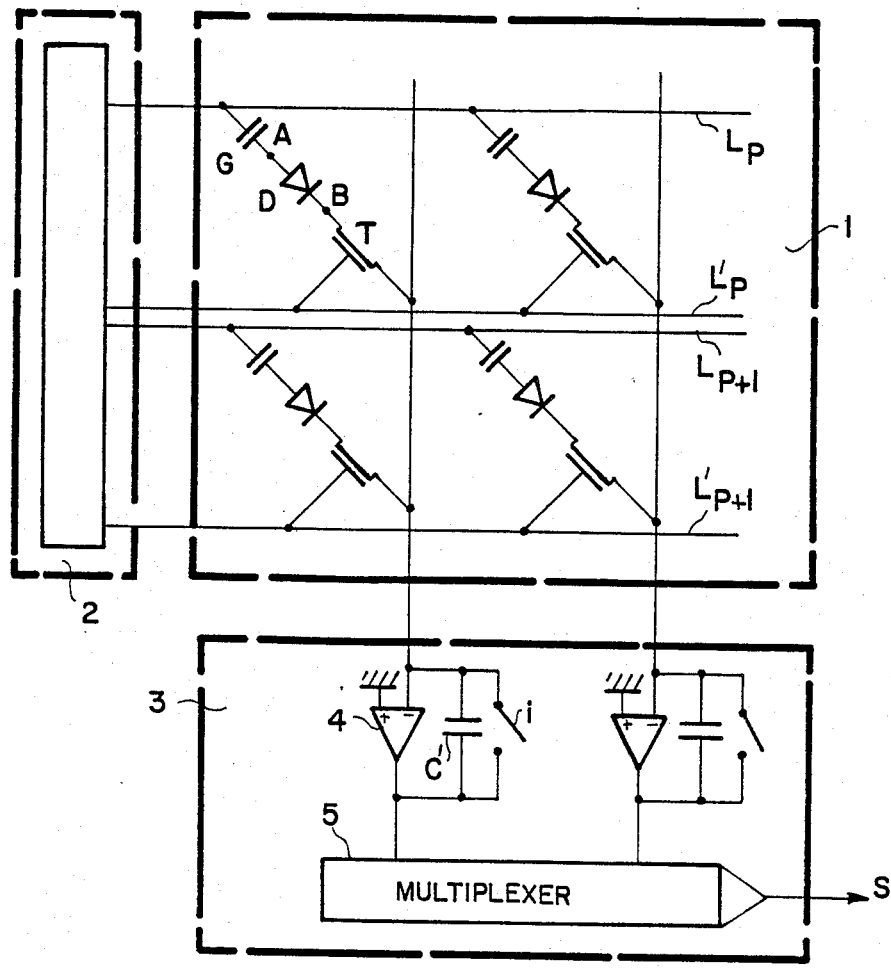
FIG_4

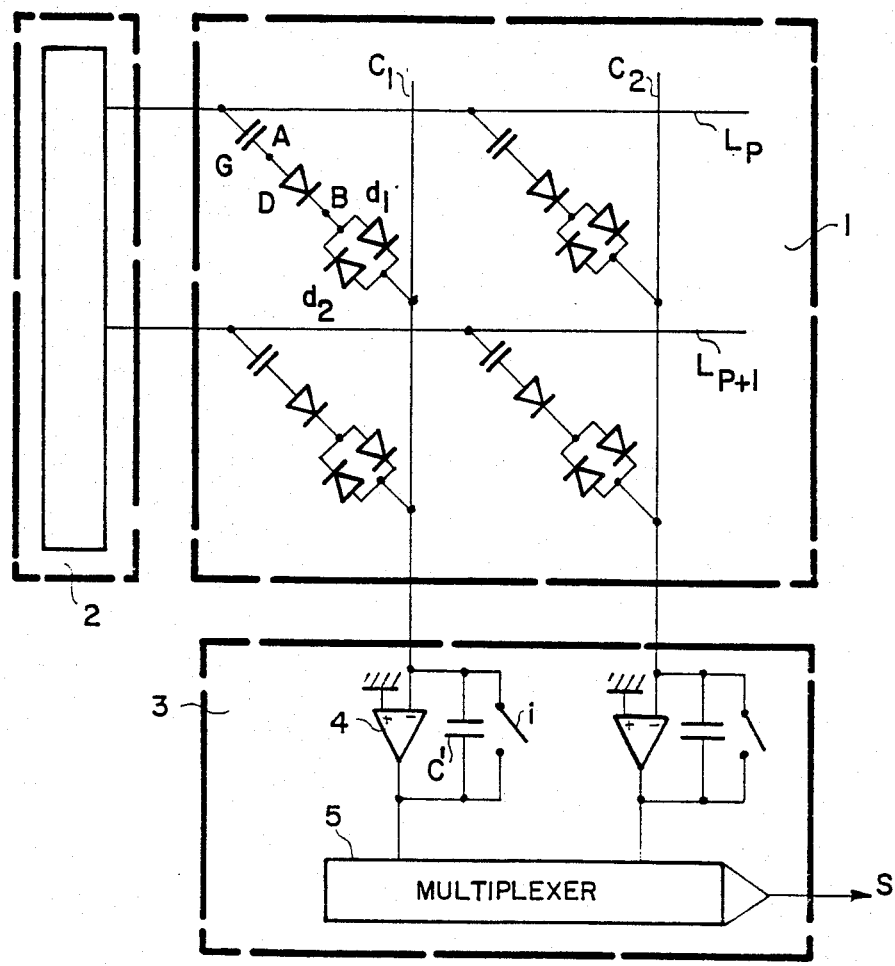
FIG_5

FIG_6
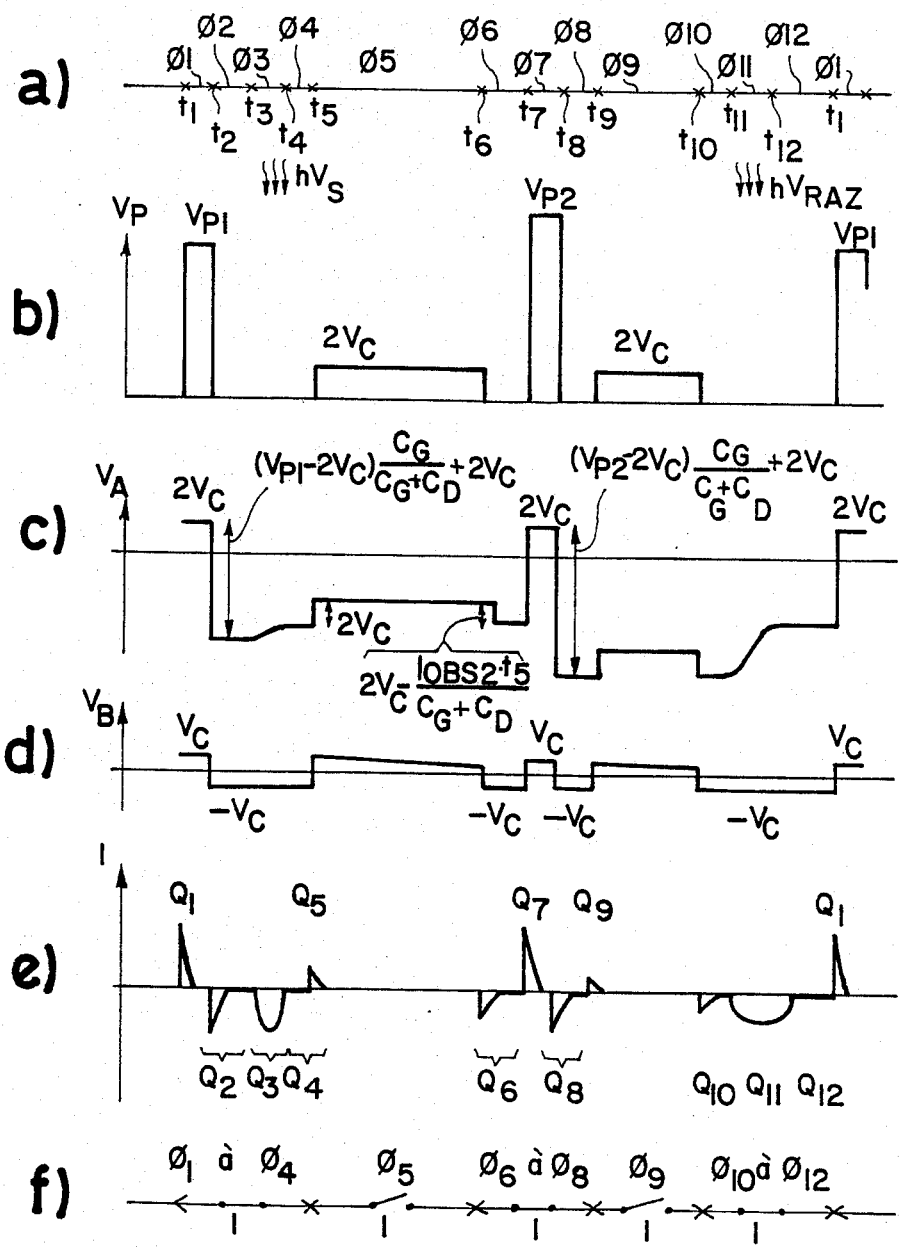

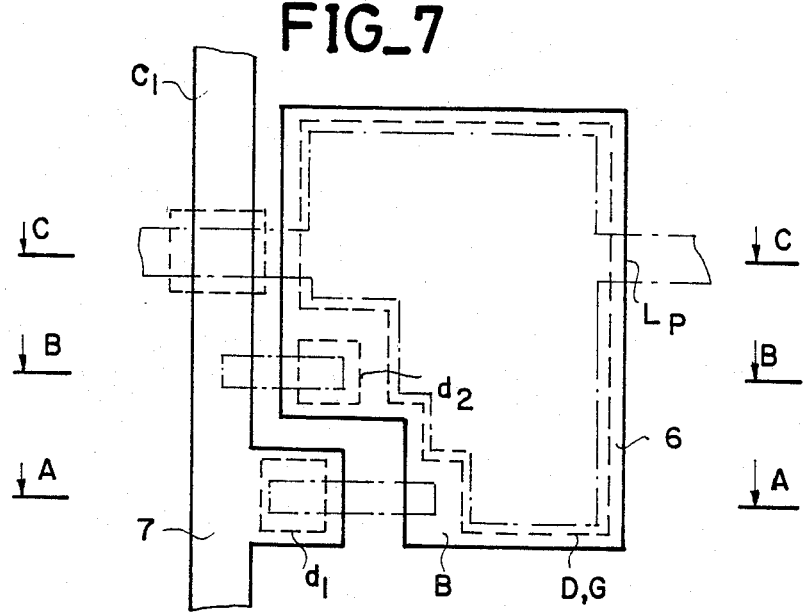
FIG_7
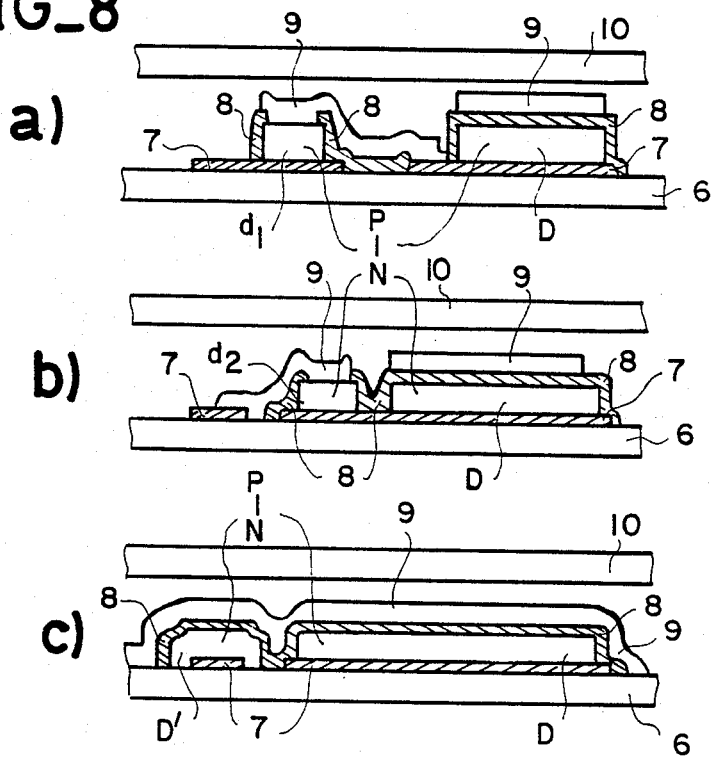
FIG_8

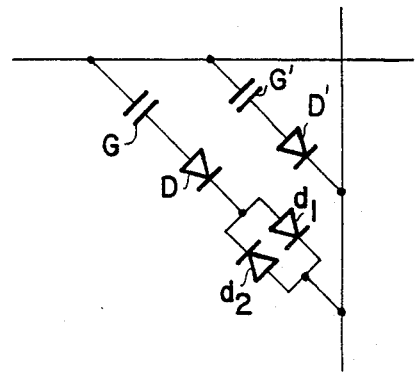
FIG_9
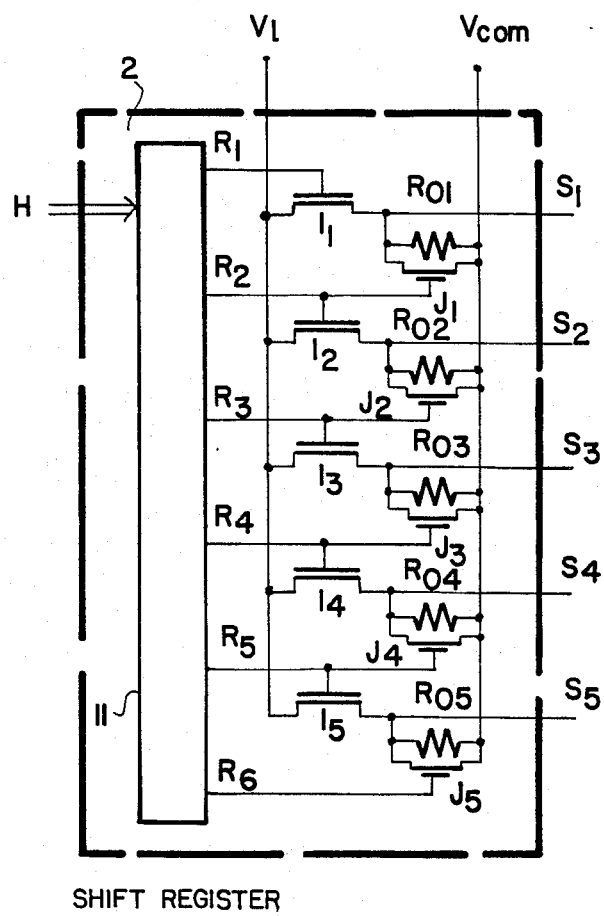
FIG_10
SHIFT REGISTER

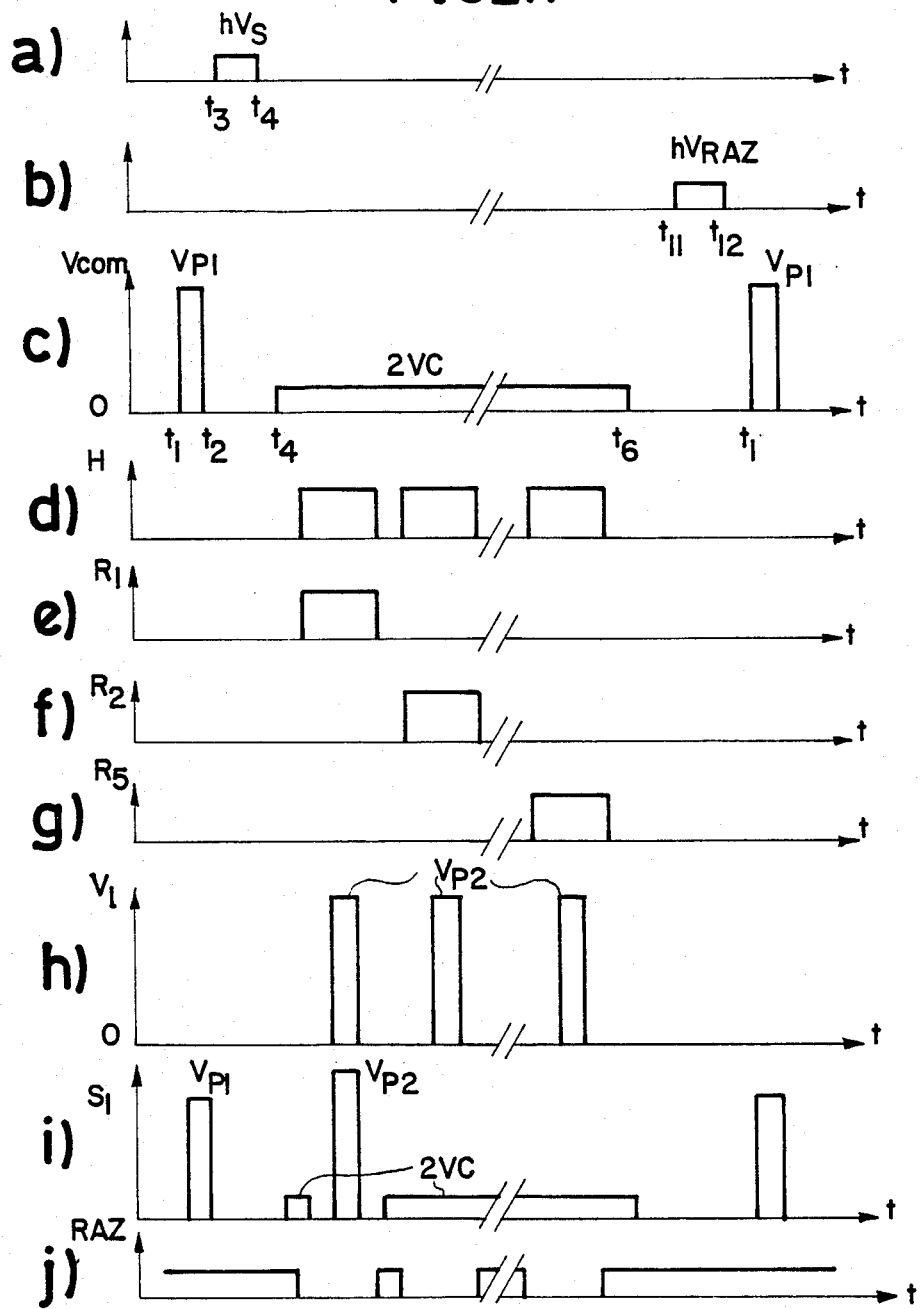
FIG_11

FIG_12
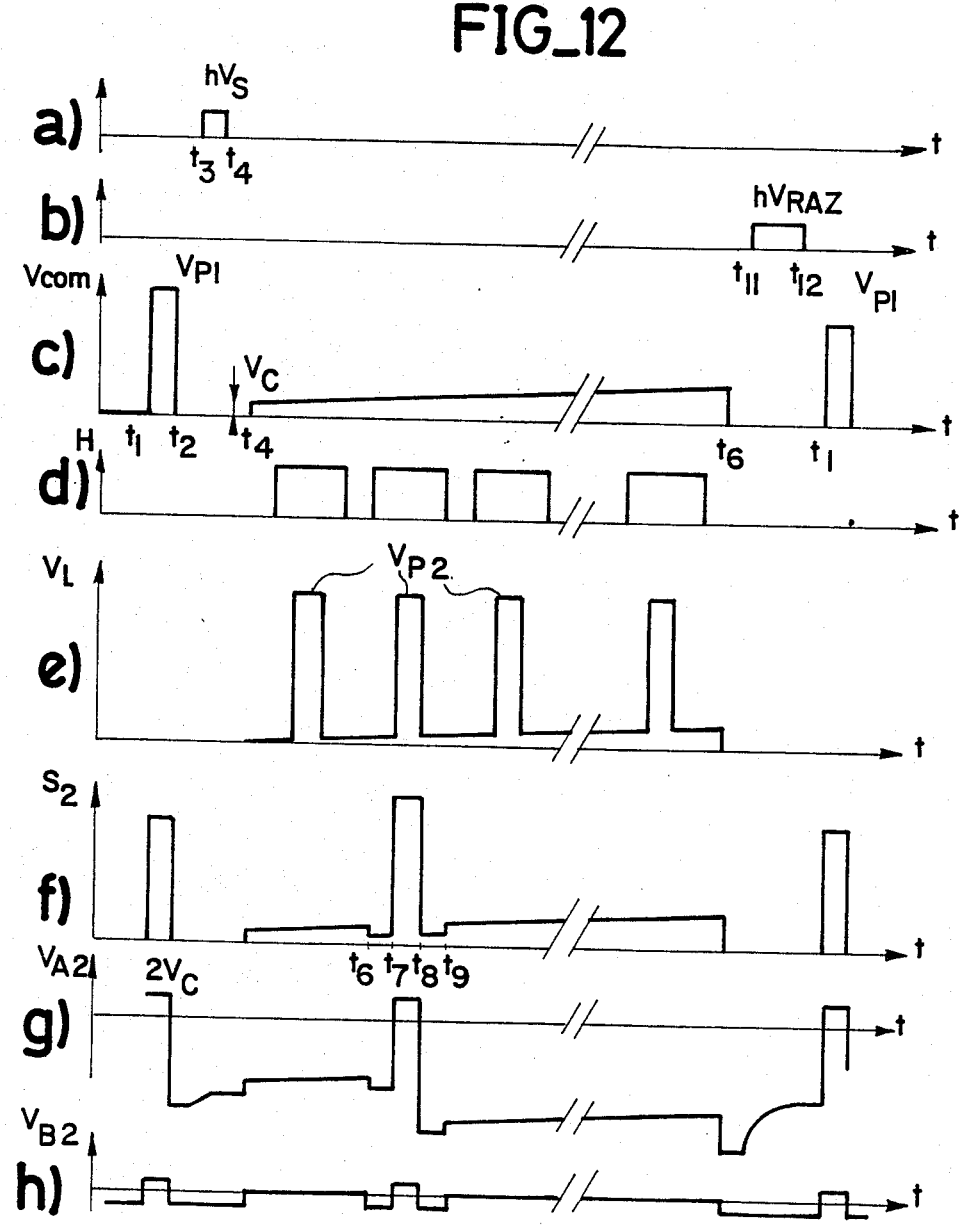

FIG_13
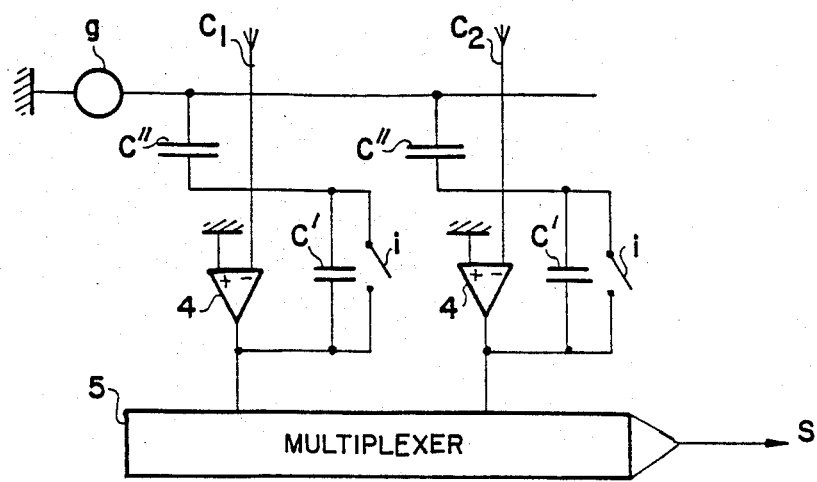
FIG_14
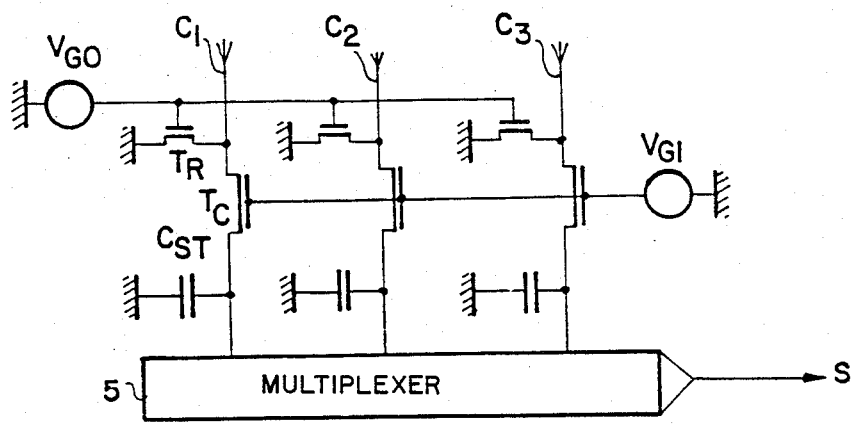

FIG_15
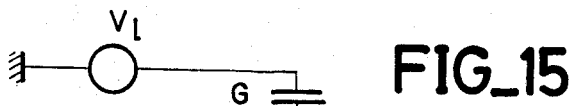
a)
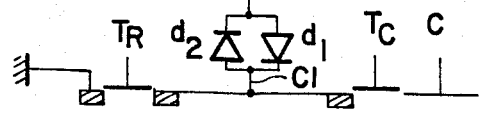
b)
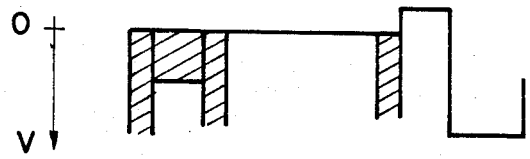
c)
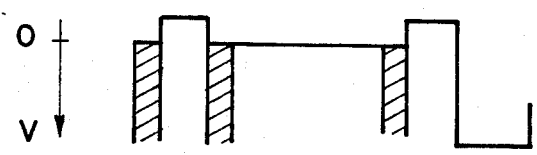
d)
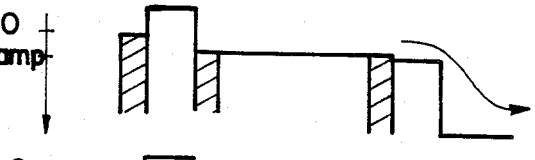
e)
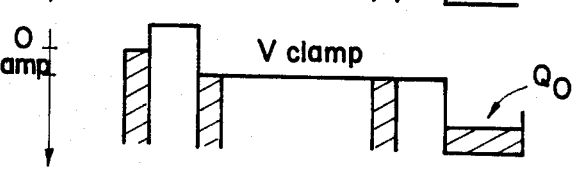
f)
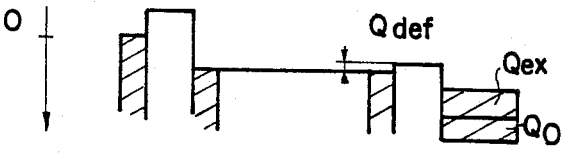
g)
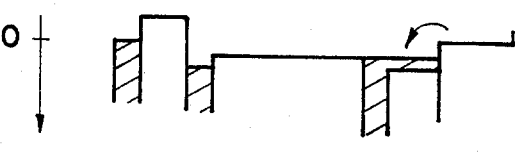
h)
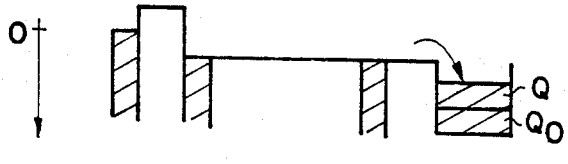

SOLID STATE LIGHT-SENSITIVE DEVICE AND METHOD FOR READING SUCH A DEVICE

BACKGROUND OF THE INVENTION

1. Field of the Invention

The present invention pertains to a solid state light-sensitive device.

2. Description of the Prior Art

The making of solid state light-sensitive devices is well known in the prior art. These devices are of the type comprising:

A network of horizontal conductors or rows and a network of vertical conductors or columns intersecting at a matrix of crosspoints;

A light-sensitive element which connects each intersecting row and column;

An addressing circuit, the outputs of which are linked to the rows;

A reading and multiplexing circuit, the inputs of which are linked to the columns.

In all these light-sensitive devices, it is sought to simplify the patterns and technologies used to the maximum extent in order to make the light-sensitive elements in such a way as to increase manufacturing output. It is also sought to decrease the capacitances of the various connections, thus making it possible to simplify the electronic circuits connected to the device. Finally, it is sought to reduce the dark currents (which are harmful) of the light-sensitive devices.

These considerations are all the more important when large-sized light-sensitive devices have to be made, as is the case with X-ray optical image formation where the radiation cannot be focused.

SUMMARY OF THE INVENTION

The present invention pertains to a light-sensitive device which can be used for the detection of visible radiation as well as of X-ray or any other type of radiation. For the detection of X-rays, a scintillator, made of gadolinium oxide for example, may be interposed in such a way as to convert the X-radiation into visible radiation detected by photodiodes. It is also possible to make the detectors with any semiconductor which can be built with sufficient thickness to ensure the direct detection of the X-rays.

It must be pointed out that the device according to the invention can be used only when there is a light signal stage and a device reading stage which are separated in time.

The present invention pertains to a solid state light-sensitive device comprising:

a plurality of horizontal conductors or rows and a plurality of vertical conductors or columns intersecting at a two dimensional matrix of crosspoints;

at each crosspoint light-sensitive element having a pair of terminals which connect the intersecting row and column;

a addressing circuit, the outputs of which are linked to the rows;

a reading and multiplexing circuit, the inputs of which are linked to the columns; and wherein each light-sensitive element is made by the series connection between its two terminals of a capacitor, a photodiode and an electronic switch.

The invention also pertains to a method for reading a light-sensitive device according to the invention.

The present invention pertains to a light-sensitive device with numerous advantages of which we might cite the following:

The fact that, in its preferred modes of embodiment, the device according to the invention comprises light-sensitive elements which require only diodes and capacitors to be made. These light-sensitive device are therefore very simple to make;

The fact that the device according to the invention has low connection capacitances. Each column of the device is linked to an operational amplifier which has a noise voltage $e_n$ which creates, at the input of the amplifier, a noise current with a value of $e_n \cdot C \cdot w$, where $C$ is the capacitance of the column and $w$ is the working pulsation. To diminish this noise current which flows through the output of the amplifier, the capacitance of the columns must be diminished. Similarly, the capcitance of the columns affects the transmiting speed of the signals in the columns. According to the invention, the connection capacitances are greatly reduced through the use of an electronic switch in each light-sensitive element of the device. During the reading of a row of light-sensitive elements, the switches belonging to the light-sensitive elements of the other rows of the device are open. When each switch comprise two oppositely-poled diodes, $d_1$ and $d_2$, connected in parallel all these other rows are in contact with the columns only through three parallel-connected capacitors which are the capacitors $C_{d1}$ and $C_{d2}$ of the diodes $d_1$ and $d_2$ in the off state and the rows/columns crosspoint capacitor $C_c$. These capacitors $C_{d1}$, $C_{d2}$ and $C_c$ are small. The row which is read is in contact with the columns by the capacitor $C_G$ belonging to each light-sensitive element. As a consequence, the capacitor $C_{col}$ of a column of a device with q rows, which is seen by the reading and multiplexing circuit when a row is read, is equal to:

$$C_{col} = C_G + (q-1) \cdot (C_{d1} + C_{d2} + C_c)$$

$$C_{col}(q-1) \cdot (C_{d1} + C_c),$$

when q is large.

This capacitor $C_{col}$ can be moderated and provides for the design of a relatively simple reading and multiplexing circuit:

The fact that the device according to the invention takes into account only a small portion of the dark current of the light-sensitive elements.

For the switches which are series connected in the light-sensitive elements are used to disconnect each row of light-sensitive elements from the columns when the other rows of the device are read. Thus, the light-sensitive elements of a row which is not read do not inject their dark current into the columns when other rows are read. The reading of a row is not disturbed by the other rows which are not read. The cross-transference of light signals from one line to another and the phenomenon of smearing are eliminated.

Furthermore, when a row of light-sensitive elements is read, the switches of this row are closed. The photodiodes then inject the dark current into the columns, this charge having been stored when these switches were open and when the other rows were being read. Then, the addressing pulse $V_{p2}$ makes this very same charge flow again but in the reverse direction. By adding up the charges which flow from the instant when the switches of a selected row are closed upto the instant when the addressing pulse $V_{p2}$ is applied, it is possible to read each row of light-sensitive elements and to compensate the dark charge stored by this row when the other rows were being read.

It must be pointed out that this compensation is far more effective than the one achieved by other systems of compensation which consist in memorizing the mean value of the dark current to subtract it from the charge read in each light-sensitive element, for the compensation achieved by the device according to the invention is precise;

The fact that, in the device according to the invention a swift and good-quality reading of the photodiodes is achieved because, for reading each row, a reading pulse $V_{p2}$ is used, the amplitude of which is greater than that of the pulses $V_{P1}$ used at the beginning of the cycle to make the photodiodes move firstly into the direct mode and then into reverse and to pre-charge them. The use of $V_{P2}$ pulses makes it necessary to carry out an operation to zero the photodiodes at the end of the cycle.

BRIEF DESCRIPTION OF THE DRAWINGS

Other objects, characteristics and results of the invention will emerge in the following description which is given by way of a non-exhaustive example and illustrated by the appended figures of which:

FIGS. 1, 4 and 5 give diagrams of various embodiments of the device according to the invention;

FIGS. 2a, 2b, 2c, 2d, 2e and 2f and 6a, 6b, 6c, 6d, 6e and 6f give a timing diagrams of the devices of FIGS. 1 and 5;

FIGS. 3a, 3b, and 3c give the characteristics I=f(V) and C=f(V) of the diodes used;

FIGS. 7, 8a, 8b and 8c and 9 give a top view, side view and diagram pertaining to an embodiment of a light-sensitive element according to an embodiment depicted in FIG. 5;

FIGS. 10, 11a, 11b, 11c, 11d, 11e, 11f, 11g, 11h, 11i and 11j and 12a, 12b, 12c, 12d, 12e, 12f, 12g and 12h depict embodiments of the addressing circuit 2 of the FIGS. 1, 4 and 5 and two timing diagrams;

FIGS. 13, 14 and depict two special embodiments of the reading and multiplexing circuit.

FIGS. 15a, 15b, 15c, 15d, 15e, 15f, 15g, and 15h show a circuit as well as a timing diagram for th FIG. 14 embodiment.

In the various figures, the same references designate the same elements but, for reasons of clarity, the sizes and proportions of the various elements are not the same.

DESCRIPTION OF THE PREFERRED EMBODIMENT

FIG. 1 is a diagram of a mode of embodiment of the light-sensitive device according to the invention.

This device comprises a light-sensitive matrix 1 comprising a network of horizontal connections or rows and a network of vertical connections or columns.

In FIG. 1, only one matrix 2×2 with two rows $L_p$ and $L_{p+1}$ and two columns $C_1$ and $C_2$ is depicted in order to explain the operation of the device.

The rows and columns intersect one another at crosspoints without, of course, being in electrical contact, and a light-sensitive element links each intersecting row and column.

According to the invention, each light-sensitive element is constituted by the series mounting of a capacitor G, a photodiode D, made of amorphous silicon for example, and an electronic switch I.

In the embodiment of FIG. 1, going from a row towards a column, we find the capacitor G, then the photodiode D, the anode of which is linked to the capacitor G at a point A and the cathode of which is linked at a point B to the switch I connected to a column.

The invention is applicable regardless of the respective position of the components which form part of the light-sensitive element. It is also possible to invert the position of the anode and the cathode of the photodiode D, i.e. it is possible, for example in the mode of embodiment of the FIG. 1, to link its cathode to the point A and its anode to the point B. This leads to modifications in the control signals, in the voltages at the points A and B and in the charges which flow, as compared with the embodiment of FIG. 1 which will be described in detail below. These modifications are easily within the scope of those skilled in the art.

The device of FIG. 1 also comprises an addressing circuit 2, the outputs of which are linked to the rows of the matrix, and a reading and multiplexing circuit 3, the inputs of which are linked to the columns of the matrix.

FIG. 1 depicts an embodiment of the reading and multiplexing circuit in which each column of the matrix is linked to the negative input of an operational amplifier 4, the positive input of which is at a constant voltage which may be the ground of the device. These amplifiers are mounted as integrators and comprise a capacitor C' connected between their negative input and their output. A switch i is parallel-mounted on each capacitor C' to provide for its zeroing. The outputs of the amplifiers are linked to a multiplexer 5 of the switches network or CCD type for example, the output of which gives the output signal S of the device.

It is known that operational amplifiers connected as integrators copy the polarization of their positive input at their negative input. In the case of FIG. 1, the positive input of the amplifiers is at a constant voltage, for example, at the ground of the device. Hence, these amplifiers link the columns, which are linked to their negative input, to the ground. Referring to the timing diagram of FIG. 2, we shall describe the operation of the device of FIG. 1 and, more specially, the functioning of a light-sensitive element of the device of FIG. 1, for example, the element located at intersection of the column $C_1$ and the $p^{th}$ row $L_P$ of the matrix.

In the following description the currents and charges flowing from each light-sensitive element towards the integrator amplifier located at the bottom of the columns are counted positively.

FIG. 2a depicts the instants $t_1$ to $t_{12}$ considered in order to describe the functioning of the device of FIG. 1 as well as the time intervals $\phi_1$ to $\phi_{12}$ considered.

FIG. 2b depicts voltage pulses $V_{P1}$ and $V_{P2}$ flowing in the rows of the matrix.

FIGS. 2c and 2d depict the voltages $V_A$ and $V_B$ at the points A and B of the light-sensitive element considered.

FIG. 2e depicts the quantity of charges flowing in the light-sensitive element considered.

FIG. 2f symbolically depicts the open or closed position of the switch I belonging to the light-sensitive element considered.

We shall now examine the functioning of the device during the different stages $\phi_1$ to $\phi_{12}$.

Stage 1

A voltage pulse $V_{P1}$ is applied to all the rows of the matrix by means of the addressing circuit.

At the instant $t_1$, the amplitude of the signal $V_P$ goes from 0 to $V_{P1}$ and at the instant $t_2$, the amplitude of the signal $V_P$ goes from $V_{P1}$ to 0.

The voltage at the point A follows, after the charging of the capacitor G, the voltage variation acting on the rows, i.e. from the instant $t_1$ onwards, $V_A$ increases and is then stabilized at the value $V_c$ which is the threshold voltage of the photodiode D, a development which directly polarizes the diode D, the cathode of which is linked to the ground by the switch I which is on.

To simplify the explanation of the functioning, it will be assumed that the diode D has a characteristic $C=f(V)$ such as the one depicted in the FIG. 3b. It is possible, however, to use any type of photodiode D, for example a photodiode of the PIN, PN or Schottky type.

During the stage 1, the switch i is closed as is shown in the FIG. 2f. To simplify the description, it will be assumed that this is a perfect switch, which explains the fact that the voltage $V_B$ is nil.

The arrival of the pulse $V_{P1}$ causes the flow of a current corresponding to a charge $Q_1$—FIG. 2e.

Stage 2

At the instant $t_2$, $V_{P1}$ returns to zero and the voltage $V_A$ becomes negative and equal to:

$$-\frac{V_{P1} \cdot C_G}{C_G + C_D},$$

where $C_G$ is the value of the capacitance G and where $C_D$ represents the capacitance of the photodiode D.

As a rule $C_G$ is chosen such that it is greater than $C_D$ so that the polarization of the point A is close to $-V_{P1}$. It is possible to choose, for example, $C_G=10C_D$.

The photodiode D of the light-sensitive element considered is reverse polarized for its cathode is still linked to the ground ($V_B=0$) by the switch I which is still conductive. The photodiode then works in the vidicon mode and will be capable of detecting light. Starting from the instant $t_2$, it generates a dark current $I_{OBS1}$ of which a fraction equal to:

$$I_{OBS1} \cdot \frac{C_G}{C_G + C_D}$$

is injected into the column.

At the instant $t_2$, there is a flow of a quantity of charge $Q_2$ with a sign contrary to that of $Q_1$.

Stage 3

During this stage, the device receives the light signal to be analyzed $hV_S$. The application of this flash of light is depicted symbolically in FIG. 2a. This flash creates a photocurrent in the photodiode D which will have a tendency to return to a voltage of zero. The voltage $V_A$ increases slightly from $t_3$ onwards. The quantity of charge created and separated in the photodiode D is called $Q_S$. The fraction $$Q_3 = Q_S \cdot \frac{C_G}{C_G + C_D}$$

is injected into the column.

Stage 4

This is a waiting stage which separates the flash of light from the reading of the device. It may be eliminated if necessary. The voltage $V_A$ is stable during this stage. The voltage $V_B$ is still zero because the switch I is closed.

There is a flow of a quantity of charge $Q_4$.

During the stages $\phi_2$ to $\phi_4$, the fraction equal to $$I_{OBS1} \cdot \frac{C_G}{C_G + C_D}$$

of the dark current $I_{OBS1}$ is injected into the column. This dark current will not be compensated for, but it must be noted that the time interval during which it flows is small compared with a full optical image formation cycle—see stage 7.

Stage 5

At the instant $t_5$, all the switches are opened. The photodiode D generates a dark current $I_{OBS2}$ which is no longer injected into the column but accumulates at the point B. The potential of the point B starts decreasing with a slope equal to $I_{OBS2}/C_D$. The maximum charge which it can store equal $2V_c \cdot C_D$. The potential of the point A remains substantially constant.

During this stage $\phi_5$, and if it is assumed, as is generally the case, that the light-sensitive matrix is read from the first row $L_1$ to the last row $L_n$, the (p−1) first rows of the matrix are read one by one, by means of signals delivered to these rows by the addressing circuit in the same way as the $p^{th}$ row during the stages 6, 7 and 8.

It is noted that the reading of the (p−1) first rows is not disturbed by the $p^{th}$ row since, during the stage $\phi_5$, the switches of the row $L_P$ are open.

Stage 6

This stage $\phi_6$ marks the start of the reading of the row $L_P$.

At the instant $t_6$, the switches of the row $L_P$ are closed. The point B is once again linked to the ground and then injects, into the column, a quantity of charges $Q_6$ corresponding to the fraction.

$$I_{OBS2} \cdot (t_6 - t_5) \frac{C_D}{C_G + C_D}$$

of the dark charge stored by the point B during the stage 5.

Stage 7

A voltage pulse $V_{P2}$ with an amplitude greater than that of $V_{P1}$ is applied to the $p^{th}$ row and to this row alone.

The potential of the point A increases and is stabilized at $V_c$ when the photodiode D is directly polarized. Since the photodiode D is directly polarized, there is a flow of a quantity of charge $Q_7$ with a sign contrary to that of the charges $Q_2$, $Q_3$, $Q_4$ and $Q_6$, and with the same sign as $Q_1$ and $Q_5$. The quantity of the charge $Q_7$ contains, as $Q_3$, the data signal. It must be noted that $Q_3$ cannot be exploited because the flash of light is sent simultaneously to the entire device, and all the photodiodes simultaneously transmit to the columns giving the mean value of the light signal applied.

According to the invention, the data signal will be obtained from the charge $Q_7$ onwards.

The device according to the invention comprises light-sensitive elements, each of which has a capacitor, a photodiode and a switch. There is therefore no direct current which flows through the light-sensitive elements.

Hence, if it is assumed that the pulses $V_{P1}$ and $V_{P2}$ are identical, we can write $\Sigma Q_i = 0$ with $i=2$ to 7. Owing to the difference in amplitude between the pulses $V_{P1}$ and $V_{P2}$, it is necessary to write:

$$Q_i = C_G(V_{P2} - V_{P1}) \text{ with } i=2 \text{ to } 7,$$

giving:

$$Q_7 = -(Q_2 + Q_3 + Q_4 + Q_5 + Q_6) + C_G(V_{P2} - V_{P1}).$$

The integration in the amplifiers linked to the columns of the charges $Q_7$ coming from the photodiodes of the row $L_P$ thus makes it possible to obtain the data signal for this row.

According to the invention, compensation is provided for the fraction of the dark current $I_{OBS2}$ equal to $$I_{OBS2} \cdot (t_6 - t_5) \frac{C_G}{C_G + C_D}$$

which is injected at the instant $t_6$ in the form of the charge $Q_6$, this fraction of dark current corresponding to the accumulation of the dark current from $t_5$ to $t_6$ when the rows $L_1$ to $L_{P-1}$ were being read.

To achieve this compensation, the charges $Q_6$ and Qhd 7 are added up in the integrator amplifiers.

$$Q_6 + Q_7 = -(Q_2 + Q_3 + Q_4 + Q_5)C_G(V_{P2} - V_{P1})$$

Thus, the quantity of charges $Q_6$ coming from the dark current $I_{OBS2}$ has been eliminated.

As a consequence, in adding up the charges which flow between the instant $t_6$ when the switches of the row $L_P$ are closed and the instant $t_7$ when the reading pulse $V_{P2}$ is applied to the row $L_P$, it is possible to read the light-sensitive elements of the row $L_P$ and to compensate $Q_6$ stored by the row $L_P$ while the other rows are read: stage $\phi_5$.

The dark current delivered during the stage $\phi_5$ no longer comes into play, whether for its mean value or for its noise.

This current is made to flow over at the time $t_7$ and it is compensated by making the addition $Q_6 + Q_7$.

To make the addition Qhd $6 + Q_7$, the reading multiplexing circuit reads each diode of the selected row by adding up the charges which flow, starting before the switches of the selected rows are closed and ending while the pulse $V_{P2}$ is applied to the selected row.

As regards the dark current $I_{OBS1}$ referred to in the stage 4, the sum $Q_6 + Q_7$ shows that it comes into play only during the stage 3 corresponding to the light flash signal and during the safety stages 2 and 4, the duration of which may be small as compared with that of the stage 5.

The use of a reading pulse $V_{P2}$ with an amplitude greater than the pre-charge pulse $V_{P1}$ causes an additional charge $C_G(V_{P2} - V_{P1})$ to flow during the stage 7 which accelerates the transfer of $Q_7$ to the column. Without this additional charge, the transfer is slow.

For on the arrival of the pulse $V_{P2}$, the polarization point of the photodiode D is shifted into the direct mode, the instantaneous shift being equal to:

$$V_{P2} \cdot \frac{C_G}{C_G + C_D},$$

then the polarization point returns to an equilibrium value of $V_C$. This return to the equilibrium value takes place according to a law of $e^{-t/R(t) \cdot C_G}$, where $R(t)$ expresses the variations of the dynamic resistance of the photodiode as a function of time.

The use of a pulse $V_{P2}$ with an amplitude of more than $V_{P1}$ shifts the mean value of the polarization point of the direct-mode photodiode into a zone where its dynamic resistance is weaker and, hence, accelerates the phenomenon of return to the equilibrium value.

The stage 6 can be eliminated. The quantity of charge which flows when the row voltage goes to $V_{P2}$ is then equal to $Q_6 + Q_7$. The switches are closed simultaneously with the change to $V_{P2}$.

Stage 8

At the instant $t_8$, $V_{P2}$ returns to 0. A variation of $V_A$ occurs, similar to the one which takes place at the instant $t_2$. The potential of the points A of the row $L_P$ moves to $$-V_{P2} \cdot \frac{C_G}{C_G + C_D}.$$

Since the switches I are always shut, the photodiodes of the light-sensitive elements of the row $L_P$ become reverse polarized.

There is a flow of a quantity of charges $Q_8$.

To read the charges signal, the charges $Q_6 + Q_7 + Q_8$ can be added up. The usefulness of this, as compared to the sum $Q_6 + Q_7$, is that the constant term, which is independent of the charges signal and of $I_{OBS2}$, is smaller.

The reading and multiplexing circuit must then provide for the reading of each diode of the selected row, by adding up the charges which flow, starting before the switches of the selected row are closed, continuing when the pulse $V_{P2}$ is applied to the selected row and ending when the pulse $V_{P2}$ returns to zero.

Stage 9

At the instant $t_9$, the switches of the row $L_P$, which has just been read, are opened. The rows $L_{P+1}$ and $L_n$ are then read and their reading is not disturbed by the dark current of the photodiodes of the row $L_P$, the switches of which are open.

The opening of these switches causes the flow of a quantity of charge $Q_9$ in the event that the switches I are not perfect. As at the start of the stage 5, the voltage $V_A$ remains substantially constant while the voltage $V_B$ decreases. To read these charge signals, the following sum can be made: $Q_6 + Q_7 + Q_8 + Q_9$.

It is then necessary to add up the charges which flow before the switches of the selected row are closed and until their opening.

The $p^{th}$ row is read by opening the switch i upon the counter-reaction of the integrator amplifiers just before stage 6. The summing of the charges is then begun. The charges can be read by means of the multiplexer when the integrator amplifiers have summed up the charges $Q_6+Q_7$ or else $Q_6+Q_7+Q_8$ or else $Q_6+Q_7+Q_8+Q_9$ Then the switches i are closed so as to reset the capacitances of the integrators at zero before the arrival of the charges coming from the row p+1.

At the end of the stage 9, the reading of all the rows of the device is ended. Before starting the next image-formation cycle, it is sought to find the same configuration of potentials, i.e. it should be possible to write the following equation for the image-formation cycle which is ending:

$\Sigma Q_i = 0$, which, since $\Sigma Q_i = C_G(V_{P2}-V_{P1})$, can also be written with i=2 to 7: $Q_8+Q_9+Q_{10}+Q_{11}+Q_{12} = -Q_1 - C_G(V_{P2}-V_{P1})$, where $Q_{10}$, $Q_{11}$ and $Q_{12}$ are charges generated during the last stages 10, 11 and 12 of the optical image formation cycle.

Since the charge $Q_1$ is positive, for the above equation to be verified, the following condition must be verified:

$|Q_8+Q_9+Q_{10}+Q_{11}+Q_{12}| \geq |C_G \cdot (V_{P2}-V_{P1})|$.

Hence, during the stages 10, 11 and 12, and especially during the stage 11, charges will be generated such that the preceding inequation is verified.

Stage 10

At the instant $t_{10}$, all the switches I of the device are closed. There is a flow of a quantity of charge $Q_{10}$ equal to:

$$I_{OBS2} \cdot (t_{11} - t_{10}) \cdot \frac{C_G}{C_G + C_D}$$

Stage 11

During this stage, the photodiodes are illuminated to make them leak and cause the flow of a quantity of charge $Q_{11}$ which is sufficient for the following inequation to be verified:

$|Q_8+Q_9+Q_{10}+Q_{11}+Q_{12}| \geq |C_G \cdot (V_{P2}-V_{P1})|$.

Generally, the entire device is illuminated simultaneously: we are therefore led to select a mean value for $Q_8$ and $Q_9$.

It is also possible not to take $Q_8$ and $Q_9$ into account and to try and satisfy only the following relation: $|Q_{10}+Q_{11}+Q_{12}| \geq |C_G \cdot (V_{P2}-V_{P1})|$, i.e. it is necessary for the absolute value of the sum of the charges that have flowed after the reading of all the rows to be greater than or equal to:

$|C_G \cdot (V_{P2}-V_{P1})|$

The stage in which the photodiodes are zeroized is called stage 11.

For the detection of X-rays, if the scintillator placed in front of the device is opaque, the rear face of the panel can be lit up. In this case, the substrate on which the light-sensitive device is made must be transparent. A substrate made of glass or quartz, for example, may be used.

The quantity of charges $Q_{11}$ can also be obtained by applying, to the rows, a voltage pulse which pushes the photodiodes D into reverse beyond their breakdown voltage, while remaining within the limits of reversible breakdown so as to cause the flow of a quantity of charges $Q_{11}$ which is sufficient to meet the condition of the inequation referred to above in the case of a zeroizing operation by optical means.

Stage 12

Stage 12 is a stage which separates the optical image-formation cycle from the following one. There is a flow of a quantity of charge $Q_{12}$.

Stage 1

A new stage 1 then begins with the application of a voltage pulse $V_{P1}$ to all the rows of the device. The charge $Q_1$ which flows, removes the excess charges which might have been brought in during stage 11. It is therefore not necessary to calibrate this charge $Q_{11}$ precisely. The same electrical configurationn as in stage 1 of the previous image is found again.

In the embodiment of the invention which has just been explained, the switches are all closed between the instant $t_{10}$ corresponding to the end of the reading of the device and the instant $t_4$ of the following optical image-formation cycle which marks the start of a new reading of the device.

It must be pointed out that when the light flash corresponding to the signal to be read is applied, it is possible to leave the switches open. The current accumulates at the point B. The switches must then be closed before the reading of the device begins, in order to permit the charges signal to flow over on to the rows and columns.

Hence the switches of the device should be closed during the stages $\phi_1$ and $\phi_4$ whereas, during the stages $\phi_2$ and $\phi_3$, they may be open or closed without its making any difference.

Similarly, it makes no difference whether the switches of the device are open or closed during the stages $\phi_{10}$ to $\phi_{12}$.

The preferred method consists in leaving the switches closed during the stages 10, 11 and 12, and even the stage 10 at the end of the stage 4 of the next optical image formation cycle.

Various embodiments of the switches I in series in each light-sensitive element may be used.

FIG. 4 depicts an embodiment where each switch I comprises a transistor T. It is possible to use, for example, a thin film transistor TFT made of amorphous silicon, a MOSFET or a JFET.

The opening or closing of the switches is then controlled by an additional network of horizontal connections $L'_P$ and $L'_{P+1}$ which are connected to the additional outputs of the addressing circuit.

In the embodiment of the FIG. 5, each switch I is made up of two oppositely-poled diodes $d_1$ and $d_2$ in parallel.

So that these switches can be properly controlled, the capacitance $C_D$ of the photodiode should be far greater than the sum of the capacitances $C_{d1}$ and $C_{d2}$ of both diodes. Thus, to simplify the explanation of the operation of the device, it is assumed that when a voltage is applied to the terminals of each light-sensitive element, it is found at the terminals of the switch.

By way of example, it is possible to choose: $C_D = 50 \cdot (C_{d1}+C_{d2})$.

Similarly, if the switch thus made is to be satisfactory, the diodes $d_1$ and $d_2$ must follow the characteristic $I=f(V)$ of FIG. 3a where the current is nil for a voltage of less than the threshold voltage $V_C$. This hypothesis is justified as the diodes $d_1$ and $d_2$, since they have low capacitances, generally have small areas and a low leakage current. With respect to this characteristic, the diodes also have zero motional impedance for a voltage higher than $V_C$.

The association of the two diodes $d_1$ and $d_2$, having the characteristic $I=f(V)$, in FIG. 3a gives a switch with the characteristics $I=f(V)$ of the FIG. 3c.

Between the voltages $-V_C$ and $+V_C$, the switch is closed while it is open for voltages higher than $+V_C$ and lower than $-V_C$.

When a switch comprising two parallel oppositely-poled diodes $d_1$ and $d_2$ is used in the device according to the invention, this switch is controlled by modulating of $2 V_C$ the potential of rows.

To simplify the explanation of the functioning of the device, it is further assumed that the diodes $d_1$ and $d_2$ have a constant capacitance depending on the voltage V when this voltage is lower than $V_C$, as depicted in FIG. 3b.

This hypothesis is verified, in particular, if the diodes $d_1$ and $d_2$ are PIN diodes.

FIG. 6 represents the timing diagram of the device of FIG. 5, the functioning of which is hardly different from that of FIG. 1.

We shall not repeat the detailed explanation of the device of FIG. 5 in the following description. With respect to FIGS. 5 and 6, we shall merely underline the differences with respect to FIGS. 1 and 2, these differences relating essentially to the fact that the switches I, comprising two oppositely-poled diodes $d_1$ and $d_2$, connected in parallel are not perfect switches.

Stage 1

The diode $d_1$ and the photodiode D are directly polarized by the voltage $V_{P1}$. Consequently, during the application of the voltage $V_{P1}$, the voltage $V_A$ is fixed at $2 V_C$ and the voltage $V_B$ at $V_C$, if it is assumed that $V_C$ is the threshold voltage of the diodes D, $d_1$ and $d_2$.

Stage 2

When the pulse $V_{P1}$ returns to zero, the voltage variation is first absorbed by the diodes $d_1$ and $d_2$ while the voltage $V_B$ goes from $+V_C$ to $-V_C$. In fact, the fraction of the voltage variation absorbed by the diodes $d_1$ and $d_2$, and by the point A is the following:

$$\frac{\frac{C_G \cdot C_D}{C_G + C_D}}{\frac{C_G \cdot C_D}{C_G + C_D} + C_{d1} + C_{d2}} \simeq 1$$

Then the point A varies by $$(V_{p1} - 2V_C)\frac{C_G}{C_G + C_D}$$

starting from 0.

The dark current of the diodes $d_1$ and $d_2$, which are weak currents in relation to those of the photodiodes D, will not be taken into account.

Stages 3 and 4

No change

Stage 5

To cause the opening of the switches, a voltage equal to $2 V_C$ is sent to the rows. The voltage $V_A$ remains substantially constant, but undergoes an increase of $2 V_C$ at the instant $t_5$. Similarly, the voltage $V_B$ goes to $+V_C$ at the instant $t_5$, and then decreases with a slope equal to $I_{OBS2}/C_D$.

Stage 6

The switches of the row $L_P$ are closed in bringing the potential of this row to zero. The potential $V_B$ becomes set at $-V_C$.

Stage 7

The voltage $V_A$ is stabilized at $2 V_C$ and the voltage $V_B$ at $V_C$.

Stage 8

The point B varies by $2 V_C$ and moves to $-V_C$, and the point A varies by:

$$(V_{p2} - 2V_C) \cdot \frac{C_G + 2V_C}{C_G + C_D}$$

starting from $2 V_C$.

Stage 9

The potential of the row $L_P$ goes to $2 V_C$, to cause the opening of the switches of this row. At the instant $t_9$, the voltages $V_A$ and $V_B$ vary by $+2 V_C$. The voltage $V_B$ goes to $+V_C$, then decreases with a slope equal to $I_{OBS2}/C_D$.

The expression of the sum $Q_6+Q_7+Q_8+Q_9$ shows that the capacitors $C_{d1}$ and $C_{d2}$ no longer come into play, a point that is useful especially to prevent errors in the reading signals from being caused by variations in these values for the different light-sensitive elements.

Stages 10, 11 and 12

The switches are all closed by bringing all the rows of the device to zero. The voltage V diminishes by $2 V_C$ then increases during stage 11. The voltage $V_B$ is stabilized at $-V_C$.

The device shown in FIG. 5 has the following advantage. During the reading of a row of light-sensitive elements, the switches belonging to the light-sensitive elements of the other rows of the device are open. All these other rows are in contact with the columns only through three capacitors in parallel which are the capacitors $C_{d1}$ and $C_{d2}$ of the diodes $d_{d1}$ and $d_{d2}$ in the off state, and the intersecting capacitor $C_c$ of the rows and columns. These capacitors, $C_{d1}$, $C_{d2}$ and $C_c$, are weak. The row which is read is in contact with columns through the capacitor $C_G$ belonging to each light-sensitive element. As a consequence, the capacitance $C_{col}$ of a column of a device with q rows, which is seen by the reading and multiplexing circuit when a row is read, is equal to:

$$C_{col}=G_G+(q-1)\cdot(C_{d1}+C_{d2}+C_c).$$

$$C_{col} \simeq (q-1)\cdot(C_{d1}+C_{d2}+C_c)$$

when Q is great.

This capacitance $C_{col}$ can be moderated and can be used to design a relatively simple reading and multiplexing circuit.

Finally, another advantage of this device is that it requires only the making of diodes and capacitors, and is therefore particularly simple to build as will be seen in an example of the next embodiment.

Furthermore, this device does not necessitate an additional system of rows to control the transistors (as it does when the switches are made up of transistors).

FIGS. 7, 8a, 8b, 8c and 9 pertain to an embodiment of the device of FIG. 5 and, more especially, to a light-sensitive element of this device.

FIG. 7 is a view from the top of the light-sensitive element thus made, and the FIGS. 8a to 8c are cutaway views along the planes AA', BB' and CC' of this device.

The transparent substrate on which the light-sensitive elements are made bears the reference 6.

This substrate has a first conducting level 7 which is used to make the columns, the contact with the columns of the diode $d_1$ (FIG. 8a) and the contact at point B of the diode D with the diodes $d_1$ and $d_2$ (FIGS. 8a and b).

Should the optical zeroizing be done through the substrate, the first conducting level 7 must be transparent.

On this first conducting level 7, a PIN layer is deposited and etched in such a way as to make the diodes $d_1$, $d_2$ and D.

In FIG. 7, the diodes $d_1$ and $d_2$ and D are bounded by dashes.

A layer of insulating material 8 is deposited and is used, in the part where it covers the diode D, to constitute the capacitor G and also to insulate the passage of the second conducting level 9. The following four contacts are opened: one contact on $d_1$ (FIG. 8a), one contact on $d_2$ (FIG. 8b), one contact on the column to link up $d_2$, one contact on the contact located beneath the diode D to link the diode $d_1$ to the diode D.

The second conducting level 9 is deposited and it is etched to link the diode $d_1$ to the point B (FIG. 8a), to link the diode $d_2$ to the column (FIG. 8b) and to make the rows.

This second conducting level 9 should be transparent to the light radiation which is to be analyzed.

FIGS. 8a, b, and c depict a scintillator 10 which faces the light-sensitive element.

In the embodiment of FIG. 8c, it can be seen that what has been made is not exactly a light-sensitive element such as those depicted in FIG. 5 but a light-sensitive element such as the one depicted in FIG. 9.

Parallel mounted on each light-sensitive element, made up by the series connection of a capacitor G, a diode D and two oppositely-poled diodes $d_1$ and $d_2$, connected in parallel there is a capacitor G' in series with a diode D'. The capacitance of the entire unit constituted by the capacitor G' and the diode D' mounted in series is equal to or less than the capacitance which a simple insulator would have exhibited. Furthermore, the probability of a fault by short-circuiting is thus lessened owing to the diode D' which is reverse polarized if the capacitor G' is in short circuit.

It is of course possible, if desired, to keep only the insulator at the intersection point of the rows and columns by engraving patterning the PIN deposit.

We have seen that the switches I of FIG. 1 could comprise a transistor or two oppositely-poled diodes in parallel.

It is also possible to make these switches with a single diode by using that part of its characteristic where it is "On" as well as that part where it is reversed and gives a leakage current in a substantially reproducible way. It is therefore necessary to use a diode, the reverse breakdown voltage of which is substantially controlled and is not too high.

The switches I can also be made up of multiple-layer elements of the NIN or PIP type.

FIG. 10 depicts an embodiment of the addressing circuit of the rows 2 which is included in FIGS. 1, 4 and 5.

This circuit comprises a logic shift register 11 monitored by at least one clock H. In the example of FIG. 10, this register comprises six outputs $R_1$ to $R_6$. Transistors $I_1$ to $I_5$ are controlled by the outputs $R_1$ to $R_5$ and are connected between a voltage $V_1$ and an output of the addressing circuit $S_1$ to $S_5$. Between each output of the circuit and a voltage $V_{com}$, is connected a resistor $R_{01}$ to $R_{05}$ which assigns the voltage $V_{com}$ to the outputs of the circuit linked to rows which are not read.

FIG. 11 is a timing diagram pertaining to the device of FIG. 10.

FIG. 11a pertains to the illumination signal. A symbolic depiction is given of the light signal to be analyzed $hV_S$ which is applied between the instants $t_3$ and $t_4$.

In the same way, on FIG. 11b, it is indicated that the zeroing illumination $hV_{RAZ}$ (RAZ: zeroing) is applied between the instants $t_{11}$ and $t_{12}$.

FIG. 11c depicts the signal $V_{com}$. This voltage $V_{com}$ comprises the various voltages to be applied to the rows when they are not read.

It is seen in FIG. 11c that the voltage $V_{com}$ comprises a voltage pulse $V_{P1}$ from $t_1$ to $t_2$, and a voltage equal to $2 V_C$ from $t_4$ to $t_6$. During the rest of the time, the voltage $V_{com}$ is a zero, that is, at the ground.

FIG. 11d depicts the clock signal H of the shift register 11 of FIG. 10.

FIGS. 11e, 11f and 11g show that each clock pulse of the signal H causes one output of the register to shift to the high level. In these figures, the outputs $R_1$, $R_2$ ... and then the output $R_5$ shift to the high level.

FIG. 11h shows the signal $V_1$. This signal $V_1$ comprises the various voltages to be applied to a row in order to read it. This signal $V_1$ is at the level 0 and, while one of the outputs of the register $R_1$, $R_2$ ... $R_5$ shifts to the high level, the signal $V_1$ generates a voltage pulse $V_{P2}$.

FIG. 11i depicts the voltages at the output $S_1$ which controls the row $L_1$ of the device.

As long as this signal $R_1$ is not at the high level, the transistor $I_1$ is off and the resistor assigns the voltage $V_{com}$ to the output $S_1$. It is seen in FIG. 11i that, as long as the signal $R_1$ is at the low level, the voltage $V_{com}$ is assigned to the output $S_1$. When the signal $R_1$ is at the high level, the voltage $V_1$ is found at the output $S_1$.

To accelerate the return to $V_{com}$ of the rows when their reading is finished, the embodiment of FIG. 10 has a transistor $J_1$ to $J_5$ mounted in parallel on the resistors $R_{01}$ to $R_{05}$. The transistors $J_1$ to $J_5$ are of the same type as the transistors $I_1$ to $I_5$ but they are controlled by the next output of the register.

Thus, the transistor $J_1$ is controlled by the output $R_2$, the transistor $J_2$ is controlled by the output $R_3$ and so on.

When the output $R_1$ is at the high level, the voltage $V_1$ is found at the output $S_1$ and the transistor $J_1$ is off.

When the output $R_1$ shifts to the low level, the output $R_2$ shifts to the high level and makes the transistor $J_1$ come on, and the voltage $V_{com}$ is at the output $S_1$.

It is also possible to use transistors $I_1$ to $I_5$ and $J_1$ to $J_5$ of the same type, but by having the transistors $J_1$ to $J_5$ controlled by the additional outputs of the register. Thus the transistor $I_1$ is controlled by the output $R_1$ and the transistor $J_1$ by the additional output $\overline{R}_1$ and so on.

It is also possible to use transistors $I_1$ to $I_5$ and $J_1$ to $J_5$ which are complementary. In this case, the transistors $I_1$ and $J_1$ are controlled by the same output of the register and the same applies to the transistors $I_2$ and $J_2$ etc. Thus, for example, the transistor $I_1$ is on while the transistor $J_1$ is off.

The transistors used may be MOS transistors or TFTs for example.

FIG. 11j depicts the control signal of the switches i which perform the zeroing operation when this signal is in the high state, of the capacitors C' linked to the operational amplifiers 4.

The monitoring of these switches i is synchronous with that of the addressing circuit.

Zeroizing takes place during the voltage pulses $V_{P1}$, in such a way that the columns are really at zero voltage. Zeroing also takes place during the signal illumination and zeroing illumination so as to prevent the integrators from being saturated.

In FIG. 11j, the switches i are open so as to perform the sum $Q_6+Q_7+Q_8$.

The voltage delivered by the addressing circuit are defined, with an indistinctness equal to a constant, owing to the capacitor G which forms part of each light-sensitive element. It is thus possible to freely choose the mean polarization voltage of each light-sensitive element. This may be useful when insulating charges related to this mean voltage emerge.

In the description of FIGS. 1, 2, 5 and 6 we have explained that there is an accumulation, at the point B, of the dark current $I_{OBS2}$ of the photodiodes during the stages 5 and 9. This occurs for all the rows which are not being read.

The potential of the point B decreases with a slope equal to $I_{OBS2}/C_D$ from $+V_C$ onwards in the case of a switch comprising two oppositely-poled parallel diodes. The maximum charge which the point B can store is equal to $2\ V_C \cdot C_D$, after which the point B is at $-V_C$ and the switch I is closed.

When the dark charge to be stored is greater than $2\ V_C \cdot C_D$, or else if the dark current of the diodes $d_1$ and $d_2$ cannot be overlooked when their polarization is approached by $+$ or $-V_C$, the maximum load, which can be compensated at the point B, will be increased by modifying the polarization of the point B during the stages 5 and 9.

During the stages 5 and 9, the potential of the point B decreases with a slop equal to $I_{OBS2}/C_D$: see FIGS. 2d and 6d. To compensate for this decrease, control voltages will be applied during the stages 5 and 9 to bring the point B to a mean zero voltage. In particular, control voltages will be applied which will increase with a slope equal to $I_{OBS2}/C_D$.

FIGS. 10 and 11a to 11j pertain to an embodiment of the addressing circuit and its timing diagram.

FIGS. 12a to 12h depict a timing diagram modified so as to increase the dark current to be stored.

FIGS. 12a and 12b are identical to FIGS. 11a and 11b. FIG. 12c shows the signal $V_{com}$ which is different from that of the FIG. 11c since, between the instants $t_4$ and $t_6$, the voltage is not permanently at $2V_C$.

Between the instants $t_4$ and $t_6$, the voltage $V_{com}$ comprises a straight-line with a slope equal to $I_{OBS2}/C_D$, $I_{OBS2}$ being a mean value of the current $I_{OBS2}$. This straight-line starts from $+V_C$ at the instant $t_4$ so as to take the point D to zero at the instant $t_4$. For, in the FIG. 6d, it is seen that the point B is at $-V_C$ at the instant $t_4$.

The FIG. 12d is similar to the FIG. 11d, but the FIG. 12e which depicts the signal $V_1$ is different from the FIG. 11h for, between two voltage pulses, $V_{P2}$, the voltage does not return to zero. The voltage pulses $V_{P2}$ are carried by a gradient which starts from zero at the instant $t_4$ and then grows with a slope equal to $I_{OBS2}/C_D$.

It makes no difference whether the high level of the pulses is constant at $V_{P2}$ as in FIG. 12e or whether it has a slope equal to $I_{OBS2}/C_D$.

FIG. 12f depicts the signal of the outputs $S_2$ of the addressing circuit of FIG. 10.

Between the instants $t_6$ and $t_9$, the signal $V_1$ is at the output $S_2$. At the instant $t_9$, the signal $V_{com}$ is once again applied to the output $S_2$. The use of a signal $V_1$ such as the one in FIG. 12e makes it possible to reduce the shift when moving from the voltage $V_1$ to the voltage $V_{com}$. Now the voltage $V_{com}$ is calculated so that the point B is close to zero.

The signal $V_1$ is superimposed on a straight-line which starts from zero while the signal $V_{com}$ is superimposed on a straight-line which starts from $V_C$ so as to give a voltage shift at $t_9$ enabling the return of the point B from $-V_C$ to zero.

FIGS. 12g and 12h depict the voltages $V_A$ and $V_B$ at two points A and B of the row controlled by the output $S_2$.

Regardless of the embodiment chosen for the addressing circuit and the reading and multiplexing circuit, we are generally led to use $V_{com}$ signals to be applied to the rows when they are not read and $V_1$ signals to be applied to a row in order to read it.

As a consequence to increase the dark charge which may be stored at a point B during the reading of the light-sensitive elements row after row, the voltages $V_{com}$ and $V_1$ are borne by a straight line of slope equal to $I_{OBS2}/C_D$, where $I_{OBS2}$ is a mean value of the dark current of the photodiodes, so as to carry the point B to a mean zero voltage.

An embodiment of the reading and multiplexing circuit 3 was seen in the description of FIGS. 1 and 2.

FIG. 13 depicts an embodiment in which the negative inputs of the amplifiers are linked by means of a capacitor C'' to a generator G giving a compensation signal which can be used to adjust the mean output voltage of the amplifiers 4.

In one embodiment of the reading and multiplexing circuit 3, this circuit is used to generate the various voltages that are to be applied to the rows which are not read. This voltage depicted in the FIG. 11c is called $V_{com}$. This signal $V_{com}$ is applied to the positive input of the amplifiers 4. It is known that these amplifiers copy, at their negative input, the voltage existing at their positive input. In this embodiment, the addressing circuit gives a constant voltage which may be equal to the ground except during the time intervals when it gives the voltages to be applied to the rows to be read. In the embodiments of the addressing circuit of FIGS. 10 and 11, it is necessary to replace the voltage $V_{com}$ by a constant voltage which may be the ground of the device.

FIG. 14 depicts a special embodiment of the addressing and multiplexing circuit 3. FIG. 15 depicts the timing diagram of the device of FIG. 14.

This embodiment makes it possible to eliminate the use of operational amplifiers which are bulky and consume much current.

In this embodiment, the reading and multiplexing circuit comprises:

One MOS transistor $T_C$, connected between a column $C_1$, $C_2$, $C_3$ and an input of the multiplexer 5. The electrode gates of these transistors receive a control voltage $V_{G1}$;

One MOS transistor $T_R$ connected between a constant voltage which may be the ground of the device and a column. The electrode gates of these transistors receive a control voltage $V_{G0}$;

A storage capacitor $C_{ST}$ connected between each input of the multiplexer and a constant voltage which may be the ground.

FIGS. 15a to 15h depict a series of elements of the device of FIG. 14, namely a transistor $T_R$, then a transistor $T_C$ and a capacitor $C_{ST}$. At the common point between the transistors $T_R$ and $T_C$, the figure depicts a column $C_1$ linked to a light-sensitive element of the type depicted in FIG. 5. The MOS transistors used are for example N-channel transistors. The capacitor $C_{ST}$ is, for example, a MOS capacitor. The FIGS. 15b to 15h depict the development in the course of time of the surface potential in the substrate. The conventions used are those or charge transfer devices. In particular, the increasing surface potentials are directed downwards.

Outside the reading stages of the device, i.e. during the stages 1, 2, 3, 4, 10, 11 and 12, a constant voltage is assigned to the columns, this constant voltage being the ground in the example of FIG. 14, making the transistors $T_R$ come "On" by acting on their control voltage $V_{G0}$.

This stage is depicted in FIG. 15b.

Before starting to read a row of the device, the transistors $T_R$ are turned off: see FIG. 15c. The surplus charges are removed from the columns (see FIG. 15d) by increasing the voltage applied to the electrode gates of the transistors $T_C$. The potential of the columns is set at a value $V_{clamp}$ which is close to the voltage $V_{G1}$ applied to the electrode gates of the transistors $T_C$: see FIG. 15e.

During the reading of the device, charges are successively injected into and then removed from the columns.

According to the various embodiments of the device of the invention, when the columns are read they may be either a potential equal to $V_{clamp}$ in which case the charge transferred to the storage capacitor $C_{ST}$ is the right one, or a potential greater than $V_{clamp}$: see FIG. 15f.

A quantity of charges $Q_o$ is transferred to each capacitor $C_{ST}$. This transfer may take place before or after the charges to be read reach the columns.

Once the row is read, the charges stored in each storage capacitor $C_{ST}$ are transferred towards the columns, and then any surplus charges are removed to the storage capacitors: see FIG. 15h.

Thus, should there be a deficit of charges $Q_{def}$ in the columns and a surplus of charges $Q_{ex}$ in the storage capacitors, the deficit is made up and the quantity of charges Q containing the data is obtained at the storage capacitors.

The quantity of charges $Q_o$ is used to apply the so-called "fill and spill" technique and also acts as a driving charge.

Unlike light-sensitive devices of the prior art, the device according to the invention comprises two points with a floating potential, namely the points A and B. The signal and the dark charge are stored at one of these floating points. The dark charge is stored at the other floating point. Thus it is possible to recover the signal: this cannot be done with the devices of the prior art.

What is claimed is:

1. A light sensitive device comprising:
   a plurality of row conductors and a plurality of column conductors forming a matrix of crosspoints,
   and a plurality of light sensing means, one at each crosspoint, each including a pair of connection terminals, and having one of its two terminals connected to the row conductor and the other of its two terminals connected to the column conductor,
   each light sensing means including serially connected between said pair of connection terminals a capacitor, a photodiode, and an electronic switch.

2. Device according to claim 1, wherein each photodiode (D) has a capacitance $C_D$ and wherein the value of the capacitance $C_G$ of the capacitor forming part of the light-sensitive element is greater than the capacitance of the photodiode $C_D$.

3. Device according to claim 2, wherein $C_G = 10 \cdot C_D$.

4. Device accordng to claim 1, wherein each electronic switch (I) comprises two oppositely poled diodes $d_1$, $d_2$ arranged in parallel.

5. Device according to claim 4, wherein, the capitance of the capacitor $C_D$ is far greater than the sum of the capacitances $C_{d1} + C_{d2}$ of the two diodes $d_1$, $d_2$.

6. Device according to claim 5, wherein $C_D = 50(C_{d1} + C_{d2})$.

7. Device according to claim 1, wherein each electronic switch (I) comprises a transistor including a control element and wherein these switches are controlled by means of an additional network of horizontal conductors ($L'_p$, $L'_{p+1}$) connected between the control element of the transistors and additional outputs of the addressing circuit.

8. Device according to claim 1, wherein each electronic switch comprises a single diode.

9. Device according to claim 1, wherein each electronic switch (I) comprises a multiple-layer element of the NIN type or the PIP type.

10. Device according to claim 1, wherein the photodiodes (D) are both of one of the following types: PIN, PN, or SCHOTTKY.

11. Device according to claim 1, for use for the detection of X-rays and wherein a scintillator is used to convert the X-radiation into visible radiation.

12. Device according to claim 1, for use for the detection of X-rays and wherein the photodiodes are made on a semi-conductor substrate, the thickness of which is sufficient to provide for the direct detection of the X-rays.

13. Device according to claim 4, wherein a capacitor (G') in series with a diode (D') is included in parallel with each light-sensitive means between each intersecting row and column.

14. Device according to claim 1, wherein the addressing circuit comprises:
   a logic shift register (11) monitored by at least one clock (H);
   a first series of transistors ($I_1$ to $I_5$) controlled by the outputs ($R_1$ to $R_5$) of the register (11) and connected between a source of voltage $V_1$ and an addressing circuit output ($S_1$ to $S_5$), this voltage $V_1$ comprising the various voltages to be applied to a row in order to read it;
   a series of resistors ($R_{01}$ to $R_{05}$) connected between each output ($S_1$ to $S_5$) of the circuit (2) and a source of voltage $V_{com}$, this voltage $V_{com}$ comprising the various voltages to be applied to the rows when they are not read.

15. Device according to clalim 14, comprising:

a second series of transistors ($J_1$ to $J_5$) controlled by the outputs ($R_1$ to $R_6$) of the register and set in parallel with the resistors ($R_{01}$ to $R_{05}$) so as to accelerate the return to the voltage $V_{com}$ when the reading is finished.

16. Device according to claim 15, wherein the transistors of the first and second series ($I_1$ to $I_5$, $J_1$ to $J_5$) are transistors of the same type, and wherein each transistor of a pair, one from each of the first and second series, controlling one and the same output of the addressing circuit, is respectively controlled by an output of the register and by the following output.

17. Device according to claim 15, wherein the transistors of the first and second series are transistors of the same type ($I_1$ to $I_5$, $J_1$ to $J_5$) and wherein each transistor of a pair one from each of the first and second series, controlling one and the same output ($S_1$ to $S_5$) of the addressing circuit (2), is respectively controlled by an output of the register ($R_1$ to $R_6$) and by its complementary output ($\overline{R_1}$ to $\overline{R_6}$).

18. Device according to clalim 15, wherein the transistors of the first and second series ($I_1$ to $I_5$, $J_1$ to $J_5$) are complementary transistors and wherein each pair of transistors one from each of the first and second series, controlling one and the same output ($S_1$ to $S_5$) of the addressing circuit (2), is controlled by the same output ($R_1$ to $R_6$) of the register (11).

19. Device according to claim 1, wherein the reading and multiplexing circuit comprises an operational amplifier connected as an integrator which is connected to each column ($C_1$, $C_2$) of the device, a capacitor (C') being connected between the negative input and the output of the amplifier, the positive input of which is at the ground, an electronic switch (i) being connected in parallel across each capacitor, the outputs of the amplifiers being linked to the inputs of a multiplexer, the output of which gives the output signal of the device.

20. Device according to claim 19, wherein the negative inputs of the operational amplifiers are linked by a capacitor (C') to a generator (G) providing a compensation signal so as to adjust the mean output voltage from the amplifiers.

21. Device according to claim 19, wherein the positive input of the operatonal amplifiers (4) connected as integrators, is no longer grounded but receives a voltage ($V_{com}$) comprising the various voltages to be applied to the rows when they are not read, and wherein the voltage $V_{com}$ is a constant voltage.

22. Device according to claim 1, wherein the reading and multiplexing circuit (3) comprises:
a MOS transistor Tc connected between each column and an output of a multiplexer;
a transistor MOS $T_R$ connected between a constant voltage and a column;
a storage capacitor $C_{ST}$ connected between each input of the multiplexer and a constant voltage.

23. Device according to claim 4, wherein the diodes $d_1$ and $d_2$ are PIN diodes.

* * * * *